J. M. CURPHEY & J. W. POINCE.
DEVICE FOR TESTING THE TEMPERATURE OF TOBACCO.
APPLICATION FILED MAY 31, 1910.
1,037,210.
Patented Sept. 3, 1912.
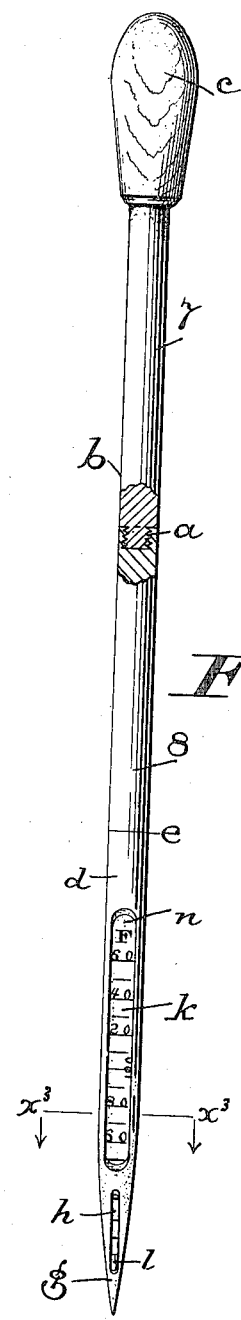
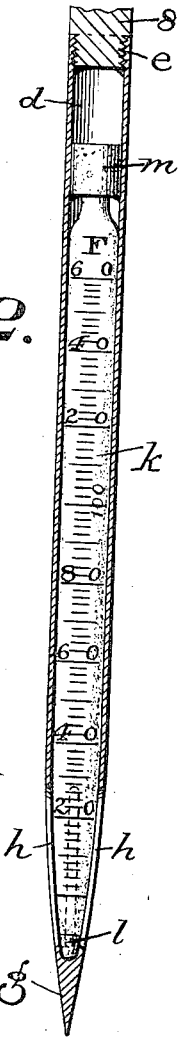

UNITED STATES PATENT OFFICE.

JOHN M. CURPHEY AND JOHN W. POINCE, OF DAYTON, OHIO.

DEVICE FOR TESTING THE TEMPERATURE OF TOBACCO.

1,037,210.  Specification of Letters Patent.  Patented Sept. 3, 1912.

Application filed May 31, 1910. Serial No. 564,044.

*To all whom it may concern:*

Be it known that we, JOHN M. CURPHEY and JOHN W. POINCE, citizens of the United States, residing at Dayton, in the county of Montgomery and State of Ohio, have invented certain new and useful Improvements in Devices for Testing the Temperature of Tobacco, of which the following is a specification.

Our invention relates to a "device for testing the temperature of tobacco."

One of the principal objects or purposes of our invention consists, in producing a device, by which the temperature of tobacco when in bulk and during the process of preparing same for manufactured articles, can be readily and accurately ascertained and determined, without the hardship and loss of time caused by having to open the bale or package containing the tobacco, or by placing a long narrow box within said bale for the reception of the thermometer;—these methods being very objectionable, further objects being to provide a device as above referred to that is simple in construction; composed of few parts; can be manufactured at a minimum cost and therefore is quite inexpensive.

It will readily be understood, that while said device is especially designed and intended for service in testing the temperature of tobacco, it can also be used in like manner for determining the temperature of any other similar articles.

Our invention consists essentially, referring briefly and in general terms to the construction of the device, of the sectional rod having the handle; the testing-tube; the thermometer and the minor details of construction; also the very peculiar and novel arrangement and combination of these various mechanical elements or parts, as will hereinafter be more fully and specifically described in detail, and set forth in the subjoined claims, all in accordance with the statutes in such cases made and provided therefor.

Referring to the accompanying drawings, constituting a formal part of this specification and illustrating our invention,—as set forth in the construction of our device for testing the temperature of tobacco;—and wherein the same numerals and letters of reference indicate or point out the same parts wherever occurring throughout the several views:—Figure 1, is a side view of our device for testing the temperature of tobacco. Fig. 2, is a longitudinal sectional view of the testing-tube,—showing the thermometer in operative position therein—but on a slightly enlarged scale from Fig. 1,—and Fig. 3, is a transverse sectional view of the testing tube, with the thermometer removed, and taken on line $x^3$—$x^3$ of Fig. 1.

In describing our said invention specifically, and referring in detail to the various mechanical parts, elements or features of construction, which in combination make up our device for testing the temperature of tobacco,—by means of the characters of reference as aforesaid; 7 and 8 refer to sections, which when connected—preferably by means of a screw-threaded joint $a$,—constitute a detachable extension body, which for rigidity and firmness, is preferably in the form of a solid rod $b$ as shown; and at the top of which is mounted a handle $c$ for convenience when inserting the device, by forcing same into the bale or package of tobacco. Said rod, may of course be made up of as many of said sections according to the length of the entire device desired,—which is regulated by the size and depth of the bale in which it is to be inserted.

Testing-tube $d$ is detachably connected to the lower section of extension-rod $b$ by a joint E—similar to joint $a$,—see Fig. 2;—and is provided with a tapered and pointed end $g$ so as to facilitate its insertion into the tobacco to be tested, which is formed with slotted ports or inlets $h$ through which all hot air generated inside of the bulk of tobacco, can pass and spread up to the thermometer $k$, which is placed in said tube and held in position therein by means of stops or bearings $l$ and $m$ which are preferably formed of a soft material, such as cork, felt or any suitable material of a similar nature. Said testing tube having an opening $n$ in its front, for reading the degrees marked on said thermometer, as the mercury therein rises or falls through the action of the heat.

Thermometer $k$ has the degrees marked thereon as high as 160° Fahrenheit, this being the highest point necessary for the mercury to rise, for the reason that tobacco will burn if the heat rises higher.

It will of course be understood that the style of the thermometer and the number of degrees marked thereon, as well as the minor details of construction of the device, may be slightly varied, if found necessary so to do, should the device be used for testing other articles besides tobacco.

Having now fully described our device, as our invention—we claim:—

1. A device for testing the temperature of tobacco, comprising a rod made up of detachable sections; a handle mounted on one end of said rod; a testing-tube having an opened front and a tapered and pointed end, detachably connected to the opposite end of said rod; slotted ports adapted to receive hot air formed in said tapered and pointed end of the testing-tube; and a thermometer located within said tube so that the degrees marked thereon will come in alinement with said opened front of the testing-tube.

2. In a device for testing the temperature of tobacco, the combination of a solid detachable extension body provided at one end with a handle; a testing-tube having an opened front, and an end tapering to a point which is provided with a plurality of slotted air inlets coming below said opened front, the opposite end of said tube forming a connection with the end of said extension-body; a thermometer within said tube; and stops within said tube for holding said thermometer in position.

In testimony whereof we affix our signatures in presence of two witnesses.

JOHN M. CURPHEY.
JOHN W. POINCE.

Witnesses:
ALLEN C. McDONALD,
WILLIAM S. RHOTEHAMEL.